R. E. GREGG.
TIRE PATCH.
APPLICATION FILED NOV. 16, 1911.
1,047,790. Patented Dec. 17, 1912.
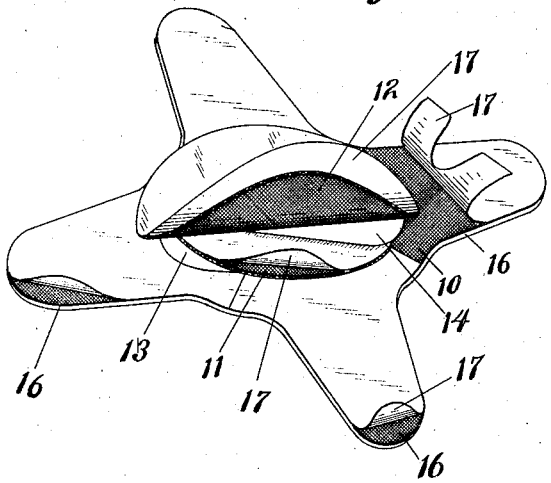
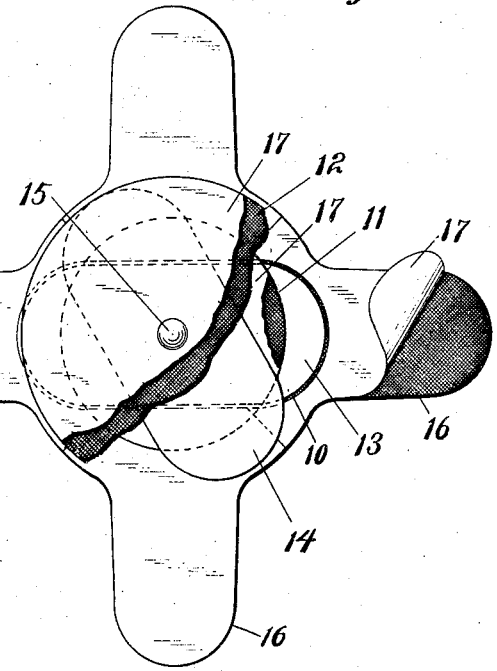
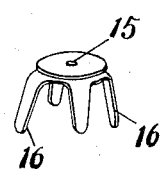
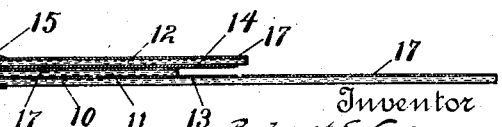
Witnesses
Frank A. Fahle
Karl R. Clendening
Inventor
Robert E. Gregg,
By Arthur M. Hood
Attorney

UNITED STATES PATENT OFFICE.

ROBERT E. GREGG, OF INDIANAPOLIS, INDIANA, ASSIGNOR TO GENERAL SPECIALTY COMPANY, OF INDIANAPOLIS, INDIANA, A CORPORATION OF INDIANA.

TIRE-PATCH.

1,047,790. Specification of Letters Patent. Patented Dec. 17, 1912.

Application filed November 16, 1911. Serial No. 660,640.

*To all whom it may concern:*

Be it known that I, ROBERT E. GREGG, a citizen of the United States, residing at Indianapolis, in the county of Marion and State of Indiana, have invented a new and useful Tire-Patch, of which the following is a specification.

It is the object of my invention to provide a tire patch which is easily and firmly applied, is sufficiently strong to withstand all ordinary pressures, and is adjustable to suit different shapes of punctures.

The various novel features of my invention will appear from the description and drawings and will be particularly pointed out in the claims.

In the drawings, which illustrate a preferred embodiment of my invention, Figure 1 is a perspective view of the complete tire patch, with certain of the layers rolled up slightly to show those below; Fig. 2 is a plan of the complete tire patch with various layers successively broken away; Fig. 3 is a transverse section through the patch, the thicknesses of the various layers being rather exaggerated; and Fig. 4 is a reduced view of the complete patch.

The patch is made up of a plurality of layers 10, 11, 12 of adhesive fabric, and interposed plates 13 and 14 of flexible but preferably non-resilient metal, the whole being fastened together by a central pivotal rivet 15. The fabric layers are preferably placed in position with their adhesive surfaces all facing the same way. The layers 11 and 12 are preferably disk-shaped, the layer 11 being somewhat smaller than is the layer 12. The layer 10 has a disk-shaped body as large as or slightly larger than the disk 12, and from this body project a plurality of tabs 16. As shown, there are four tabs 16, spaced 90° apart. The metal plates 13 and 14, which alternate with the fabric layers, are preferably of somewhat greater length than width, as illustrated, so that they have each a major axis and a minor axis. The end of these metallic plates are preferably rounded, and their major axes are substantially equal to the diameter of the fabric disk 12. In order to prevent the adhesive surfaces of the fabric layer from sticking before the patch is used, such surfaces are covered with layers of some cheap fabric or paper 17, which may be peeled off when the patch is to be used. If the patch is needed to repair a straight cut, the two metallic layers 13 and 14 are preferably placed with their major axes co-incident and extending along such cut. However, if an angular cut is to be repaired, the two metallic plates are preferably placed so that their major axes will extend along the two lines of the cut, the central rivet 15 acting as a pivot for relative turning between the different layers. In either case the protective layers 17 are peeled off and the adhesive surfaces pressed against the inside of the tire with the patch in the proper position. If the puncture is near the edge of the tire, one or more of the tabs 16 may be cut off, these tabs being provided merely as convenient handles for pulling the patch taut. After the patch has been properly located, and pressed firmly against the inside of the tire, it is held in place both by its adhesive surfaces and by the pressure of inflation behind it. The adhesive surfaces also fasten the second layer of the patch firmly in proper relative position.

My invention is capable of considerable modification in its details, and I aim to cover all modifications which do not involve a departure from the spirit and scope of my invention.

What I claim as new is:

1. A tire patch comprising two layers of fabric each adhesive on one side and non-adhesive on the other with the adhesive surfaces faced the same way, and a layer of sheet metal between said two layers of fabric and covering less than the whole of the adjacent surfaces of said layers of fabric.

2. A tire patch comprising two outside layers of fabric, two substantially elliptical metallic plates located between said layers of fabric, and a central rivet fastening the layers together and serving as a pivot around which the two middle layers may be adjusted relatively to each other.

3. A tire patch comprising a plurality of layers of fabric each adhesive on one side and non-adhesive on the other with their adhesive surfaces all faced the same way, one or more layers of sheet metal located between the fabric layers and covering less than the whole of the adjacent surfaces of said layers of fabric, and removable adhesive protective layers covering the adhesive surfaces of the fabric layers.

4. A tire patch comprising two outside layers of fabric, two flexible sheet metal plates located in separate layers between said layers of fabric, each sheet metal plate being of greater length than width, and a central rivet fastening the layers together and serving as a pivot around which the two metal layers may be adjusted relatively to each other.

5. A tire patch comprising two outside layers of fabric, two flexible sheet metal plates located in separate layers between said layers of fabric, each sheet metal plate being of greater length than width, a layer of fabric separating said sheet metal plates, and a central rivet fastening the layers together and serving as a pivot around which the two metal layers may be adjusted relatively to each other.

6. A tire patch comprising two outside layers of fabric, two flexible sheet metal plates located in separate layers between said layers of fabric, each sheet metal plate being of greater length than width, and a central rivet fastening the layers together and serving as a pivot around which the two metal layers may be adjusted relatively to each other, said layers of fabric each being adhesive on one side and non-adhesive on the other, with the adhesive sides all faced the same way.

7. A tire patch comprising two outside layers of fabric, two flexible sheet metal plates located in separate layers between said layers of fabric, each sheet metal plate being of greater length than width, and a layer of fabric separating said sheet metal plates and having a diameter which is intermediate between the longest and shortest dimensions of the metal plates.

8. A tire patch comprising two layers of fabric, a plate of sheet metal interposed between said layers of fabric and riveted thereto, one of said layers of fabric being provided with tabs projecting from its edges.

In witness whereof, I have hereunto set my hand and seal at Indianapolis, Indiana, this 13th day of November, A. D. one thousand nine hundred and eleven.

ROBERT E. GREGG. [L. S.]

Witnesses:
  JOHN N. COULTER,
  G. B. SCHLEY.